United States Patent
Magoshi et al.

(10) Patent No.: US 6,463,729 B2
(45) Date of Patent: Oct. 15, 2002

(54) COMBINED CYCLE PLANT WITH GAS TURBINE ROTOR CLEARANCE CONTROL

(75) Inventors: Ryotaro Magoshi; Naoki Hagi; Taku Ichiryu, all of Takasago (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 5 days.

(21) Appl. No.: 09/780,409

(22) Filed: Feb. 12, 2001

(65) Prior Publication Data

US 2001/0025481 A1 Oct. 4, 2001

(30) Foreign Application Priority Data

Mar. 31, 2000 (JP) .......................... 2000-099668

(51) Int. Cl.⁷ ................ F02C 6/18; F02C 7/00
(52) U.S. Cl. ............... 60/39.182; 60/805; 415/178
(58) Field of Search .............. 60/39.182, 784, 60/785, 805, 806; 415/114, 173.1, 178

(56) References Cited

U.S. PATENT DOCUMENTS

| | | | |
|---|---|---|---|
| 3,975,901 A | * 8/1976 | Hallinger et al. | ............ 60/786 |
| 4,213,296 A | * 7/1980 | Schwarz | ................ 60/786 |
| 4,363,599 A | * 12/1982 | Cline et al. | ............... 415/178 |
| 4,571,935 A | 2/1986 | Rice | |
| 5,685,693 A | 11/1997 | Sexton et al. | |

FOREIGN PATENT DOCUMENTS

EP         0889203 A2     1/1999

* cited by examiner

Primary Examiner—Louis J. Casaregola
(74) Attorney, Agent, or Firm—Wenderoth, Lind & Ponack, L.L.P.

(57) ABSTRACT

Gas turbine rotor blade tip loss is reduced and loss caused by leakage of working fluid through gap between members constituting an annular flow passage is reduced. Turbine (AT) of a gas turbine (GT) constituting a combined cycle plant (CC) is supported to a turbine casing (4) to be expandable or contractible in turbine shaft (32) radial direction. First blade ring (41) corresponds to first stage turbine stator blades (TS1) and rotor blades (TR1) and comprises a first heating medium flow passage (41P) for steam circulation therein. Second blade ring (42) corresponds to second stage turbine stator blades (TS2) and rotor blades (TR2) and comprises a second heating medium flow passage (42P) for steam circulation therein. Further provided is a communication member (45) for connecting the first blade ring (41) and second blade ring (42) to each other and for communicating the first heating medium flow passage (41P) and second heating medium flow passage (42P) with each other.

6 Claims, 5 Drawing Sheets

COMBINED CYCLE PLANT WITH GAS TURBINE ROTOR CLEARANCE CONTROL

BACKGROUND OF THE INVENTION

1. Field of the Invention

The present invention relates to a gas turbine and a combined cycle plant comprising combined cycles of this gas turbine and a steam turbine.

2. Description of the Prior Art

As one conventional example of the mentioned art, that disclosed by the Japanese laid-open patent application Hei 9(1997)-4411 is known. A conventional gas turbine mentioned therein is what is called a double casing type gas turbine comprising an outer casing (outer structural shell as a container) and a blade ring (inner shell) constituting an inner casing. In this gas turbine, the blade ring is provided surrounding first stage and second stage portions and is fitted with a ring segment (shroud) surrounding each of turbine rotor blades constituting a cascade of first stage rotor blades and another ring segment (shroud) surrounding each of turbine rotor blades constituting a cascade of second stage rotor blades. Likewise, the blade ring is fitted with an outer shroud of each of turbine stator blades constituting a cascade of first stage stator blades and another outer shroud of each of turbine stator blades constituting a cascade of second stage stator blades.

Also, the blade ring is supported to the outer casing via a plurality of pins extending in a radial direction of a turbine shaft so as to be expandable and contractible in the radial direction of the turbine shaft. In the blade ring, there are provided two flow passages (plenums) so as to extend along the first stage and second stage rotor blade cascades, so that heating medium supplied from a heating medium supply source which is irrespective of the gas turbine operation is flown therethrough. Accordingly, in this gas turbine, heating medium of an appropriate temperature is supplied to the respective flow passages of the blade ring so that the respective blade rings (as well as the ring segments) may be expanded and contracted in the radial direction of the turbine shaft. As the result of this, even if the turbine rotor blade is thermally expanded or contracted in the radial direction due to temperature changes of the working fluid in operation, a gap between a blade tip of the turbine rotor blade and the ring segment can be adjusted appropriately and a loss at the rotor blade tip can be reduced.

However, if temperature of the working fluid changes in operation of the gas turbine, there occurs a thermal expansion and contraction also in an extending direction of the turbine shaft (axial direction) in the ring segment which is located around the turbine rotor blades for forming an annular flow passage and in the outer shroud of the turbine stator blade. For this reason, while the ring segment and the outer shroud of the turbine stator blade, which are adjacent to each other, are arranged to abut on, or engage with, each other so as to be expandable and contractible in the axial direction, respectively, a gap between these members is enlarged according to the degree of the thermal expansion or contraction of each of the members so that the working fluid may leak out therethrough to invite an increase of the loss.

SUMMARY OF THE INVENTION

In view of the problem in the prior art, therefore, it is an object of the present invention to provide a gas turbine which is able to reduce a loss at a rotor blade tip and to reduce a loss caused by leakage of working fluid through a gap between members constituting an annular flow passage as well as to provide a combined cycle plant comprising such gas turbine.

A gas turbine, as claimed in Claim 1 of the present invention, for generating power by expanding a high temperature high pressure working fluid at a plurality of stages of a turbine stator blade a cascade provided in a turbine casing and a plurality of stages of a turbine rotor blade cascade fitted to a turbine shaft, is characterized in comprising; a first blade ring, supported to the turbine casing so as to be expandable and contractible in a radial direction of the turbine shaft, corresponding to a first turbine stator blade cascade and a first turbine rotor blade cascade which constitute any one stage of the plurality of stages; a second blade ring, supported to the turbine casing so as to be expandable and contractible in the radial direction of the turbine shaft, corresponding to a second turbine stator blade cascade and a second turbine rotor blade cascade which constitute another stage adjacent to the one stage; a first heating medium flow passage, provided in the first blade ring, for circulating therethrough a predetermined heating medium; a second heating medium flow passage, provided in the second blade ring, for circulating therethrough the predetermined heating medium; and a communication member for connecting the first blade ring and the second blade ring to each other and for communicating the first heating medium flow passage and the second heating medium flow passage with each other.

In the turbine included in the above gas turbine, the first blade ring which corresponds to any one stage (the first stage, for example) and the second blade ring which corresponds to another stage adjacent to the mentioned one stage (the second stage, for example) are provided and members constituting the annular flow passage (outer shrouds of the stator blades, ring segments, etc.) are supported by these first and second blade rings. Also, the first blade ring has the first heating medium flow passage formed preferably so as to surround the outer circumferential periphery of the first rotor blade cascade and the second blade ring has the second heating medium flow passage formed preferably so as to surround the outer circumferential periphery of the second rotor blade cascade, and a heating medium, such as steam supplied from a predetermined heating medium supply source, is circulated through the first and second heating medium flow passages. Thereby, in operation of the gas turbine, even if the turbine rotor blade expands or contracts in the radial direction of the turbine shaft due to temperature changes of the working fluid, the first and second blade rings are expanded or contracted in the radial direction and the gap between the blade tip of the turbine rotor blade and the members constituting the annular flow passage can be adjusted appropriately.

In this gas turbine, in addition to the above, the first blade ring and the second blade ring are connected to each other by the communication member so that both of the blade rings are integrated substantially. Moreover, the first heating medium flow passage and the second heating medium flow passage are communicated with each other via a flow passage provided in the communication member. Accordingly, the heating medium supplied into the first heating medium flow passage, etc. is to flow through the flow passage of the communication member which connects the first blade ring and the second blade ring to each other and hence, like the first blade ring and the second blade ring, the communication member also expands and contracts corresponding to the temperature of the heating medium.

As the result of this, in the present gas turbine, the heating medium of an appropriate temperature is supplied into the first heating medium flow passage, etc. and thereby the communication member connecting the first blade ring and the second blade ring to each other is expanded or contracted and the position of the first blade ring and the second blade ring can be changed so as to correspond to and follow the constituting members of the annular flow passage which is expanded or contracted by the temperature changes of the working fluid, etc. By so doing, in the present gas turbine, the blade tip loss of the rotor blade can be reduced and the loss caused by leakage of the working fluid through the gap between the members constituting the annular flow passage can be reduced.

In this case, the mentioned gas turbine preferably further comprises a first annular member surrounding the first turbine rotor blade cascade and a second annular member surrounding the second turbine rotor blade cascade and is constructed such that a first outer shroud of each of turbine stator blades, which constitute the first turbine stator blade cascade, and the first annular member engage slidably with each other and the first outer shroud and the first annular member, respectively, are fixed at one side of their both sides in a flow direction of the working fluid to the first blade ring, and a second outer shroud of each of turbine stator blades, which constitute the second turbine stator blade cascade, and the second annular member engage slidably with each other and the second outer shroud and the second annular member, respectively, are fixed at one side of their both sides in the flow direction of the working fluid to the second blade ring.

Also, it is preferable that a seal member is interposed between the first outer shroud of each of the turbine stator blades, which constitute the first turbine stator blade cascade, and the first annular member and between the second outer shroud of each of the turbine stator blades, which constitute the second turbine stator blade cascade, and the second annular member, respectively.

By such arrangement, the loss caused by leakage of the working fluid through the gap between the ring segment and the outer shroud of the turbine stator blade, both of which constitute the annular flow passage, can be reduced effectively.

In this case, it is preferable that the seal member is formed in a wave-like cross sectional shape having a plurality of mountain-like winding portions and is arranged with the winding portions being directed to the radial direction of the turbine shaft.

In the mentioned construction, the size of the seal member is made so as to meet a planned maximum value of the gap between the ring segment and the outer shroud of the turbine stator blade. Thereby, even if the gap between the ring segment and the outer shroud of the turbine stator blade expands or contracts thermally, the seal member can be deformed elastically so that expansion or contraction of the ring segment and the outer shroud of the turbine stator blade may be absorbed smoothly and precisely. As the result of this, the gap between the ring segment and the outer shroud of the turbine stator blade can be sealed excellently. As the seal member, what is called an E seal, which is formed in the wave-like cross sectional shape by bending a metal member in a W letter shape, may be employed.

Also, it is preferable that the second blade ring is located downstream of the first blade ring in the flow direction of the working fluid and the heating medium which has passed through the second heating medium flow passage provided in the second blade ring is led into the first heating medium flow passage provided in the first blade ring via the communication member and this heating medium which has passed through the first heating medium flow passage is led into a transition piece interior of a combustor which burns the working fluid.

By employing such construction, the heating medium which has passed through the second blade ring (the second heating medium flow passage), the communication member and the first blade ring (the first heating medium flow passage), sequentially, can be further made use of for cooling the interior of the combustor transition piece. In this case, the heating medium is taken out easily from the combustor transition piece and the circulation system of the heating medium can be made simplified.

A combined cycle plant, as claimed in Claim 6 of the present invention, comprising a steam turbine cycle for recovering and reusing exhaust heat of a gas turbine, is characterized in that the gas turbine comprises; a plurality of stages of a turbine stator blade cascade provided in a turbine casing; a plurality of stages of a turbine rotor blade cascade fitted to a turbine shaft; a first blade ring, supported to the turbine casing so as to be expandable and contractible in a radial direction of the turbine shaft, surrounding the turbine rotor blade cascade of any one stage of the plurality of stages; a second blade ring, supported to the turbine casing so as to be expandable and contractible in the radial direction of the turbine shaft, surrounding the turbine rotor blade cascade of another stage adjacent to the one stage; a first heating medium flow passage, provided in the first blade ring, for circulating therethrough steam supplied from the steam turbine cycle; a second heating medium flow passage, provided in the second blade ring, for circulating therethrough the steam supplied from the steam turbine cycle; and a communication member for connecting the first blade ring and the second blade ring to each other and for communicating the first heating medium flow passage and the second heating medium flow passage with each other.

In the gas turbine constituting the mentioned combined cycle plant, the steam taken from the steam turbine cycle (bottoming cycle) is supplied into the first heating medium flow passage, etc. and thereby the communication member connecting the first blade ring and the second blade ring to each other is expanded or contracted and the position of the first blade ring and the second blade ring can be adjusted so as to correspond to and follow the constituting members of the annular flow passage which expand or contract due to the temperature changes of the working fluid, etc. By so doing, while the steam of the steam turbine cycle is made use of effectively, the blade tip loss of the gas turbine rotor blade can be reduced and the loss caused by leakage of the working fluid through the gap between the members which constitute the annular flow passage can be reduced as well.

DESCRIPTION OF THE PREFERRED EMBODIMENTS

Herebelow, preferred embodiments of a gas turbine according to the present invention and a combined cycle plant comprising this gas turbine will be described concretely with reference to figures.

Figure 1:
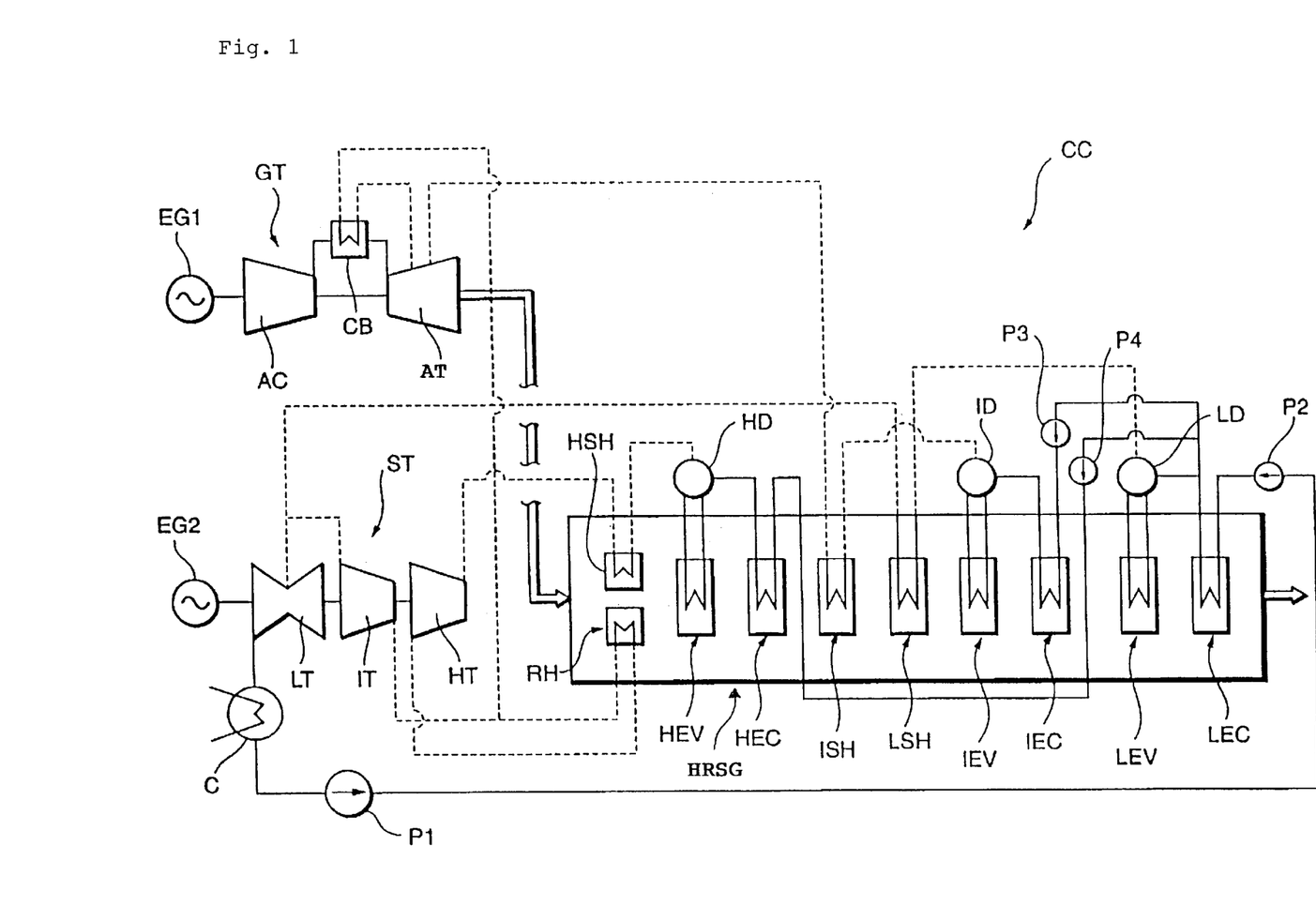
FIG. 1 is a system diagram showing a combined cycle plant according to the present invention.

FIG. 1 is a system diagram showing a combined cycle plant according to the present invention. The combined cycle plant CC, shown in FIG. 1, comprises basically a gas turbine GT, a heat recovery steam generator HRSG and a steam turbine ST. In the gas turbine GT, air pressure is elevated at a compressor AC and combustion of fuel together with compressed air is effected at a combustor CB to generate a working fluid. The working fluid is expanded at a turbine AT for driving an electric generator EG1. Exhaust gas discharged from the turbine AT of the gas turbine GT is led into the heat recovery steam generator HRSG to be used as a heat source for generating steam. The steam generated at the heat recovery steam generator HRSG is supplied into the steam turbine ST as a drive source.

The steam turbine ST comprises a high pressure turbine HT, an intermediate pressure turbine IT and a low pressure turbine LT and drives an electric generator EG2. The high pressure turbine HT is supplied with a superheated steam from a high pressure superheater HSH of the heat recovery steam generator HRSG. The superheated steam expands at the high pressure turbine HT to become a saturated steam which has lost its energy. This saturated steam is reheated at a reheater RH of the heat recovery steam generator HRSG and is supplied into the intermediate pressure turbine IT. Also, the low pressure turbine LT is supplied with steam superheated at a low pressure superheater LSH of the heat recovery steam generator HRSG and with steam which has passed through the intermediate pressure turbine IT. Saturated steam which has expanded at the low pressure turbine LT and lost its energy is led into a condenser C to be cooled and condensed to water. The water recovered in the condenser C is led into a low pressure economizer LEC of the heat recovery steam generator HRSG via a condensate pump P1 and a recirculation pump P2.

The condensed water is preheated at the low pressure economizer LEC and is evaporated at a low pressure evaporator LEV and is then sent to the low pressure superheater LSH via a low pressure drum LD to be superheated at the low pressure superheater LSH. Also, a portion of the condensed water preheated at the low pressure economizer LEC is led into an intermediate pressure economizer LEC via an intermediate pressure feed water pump P3 as well as led into a high pressure economizer (primary and secondary) HEC via a high pressure feed water pump P4, respectively. The condensed water preheated at the intermediate pressure economizer IEC is evaporated at an intermediate pressure evaporator IEV and is sent to an intermediate pressure superheater ISH via an intermediate pressure drum ID. Steam superheated at the intermediate pressure ISH is supplied to the gas turbine GT side to be used for cooling and other purposes and is then supplied into the intermediate pressure turbine IT. Also, the condensed water preheated at the high pressure economizer HEC is evaporated at the high pressure evaporator HEV and is sent to the high pressure superheater HSH via a high pressure drum HD to be superheated at the high pressure superheater HSH.

Figure 2:
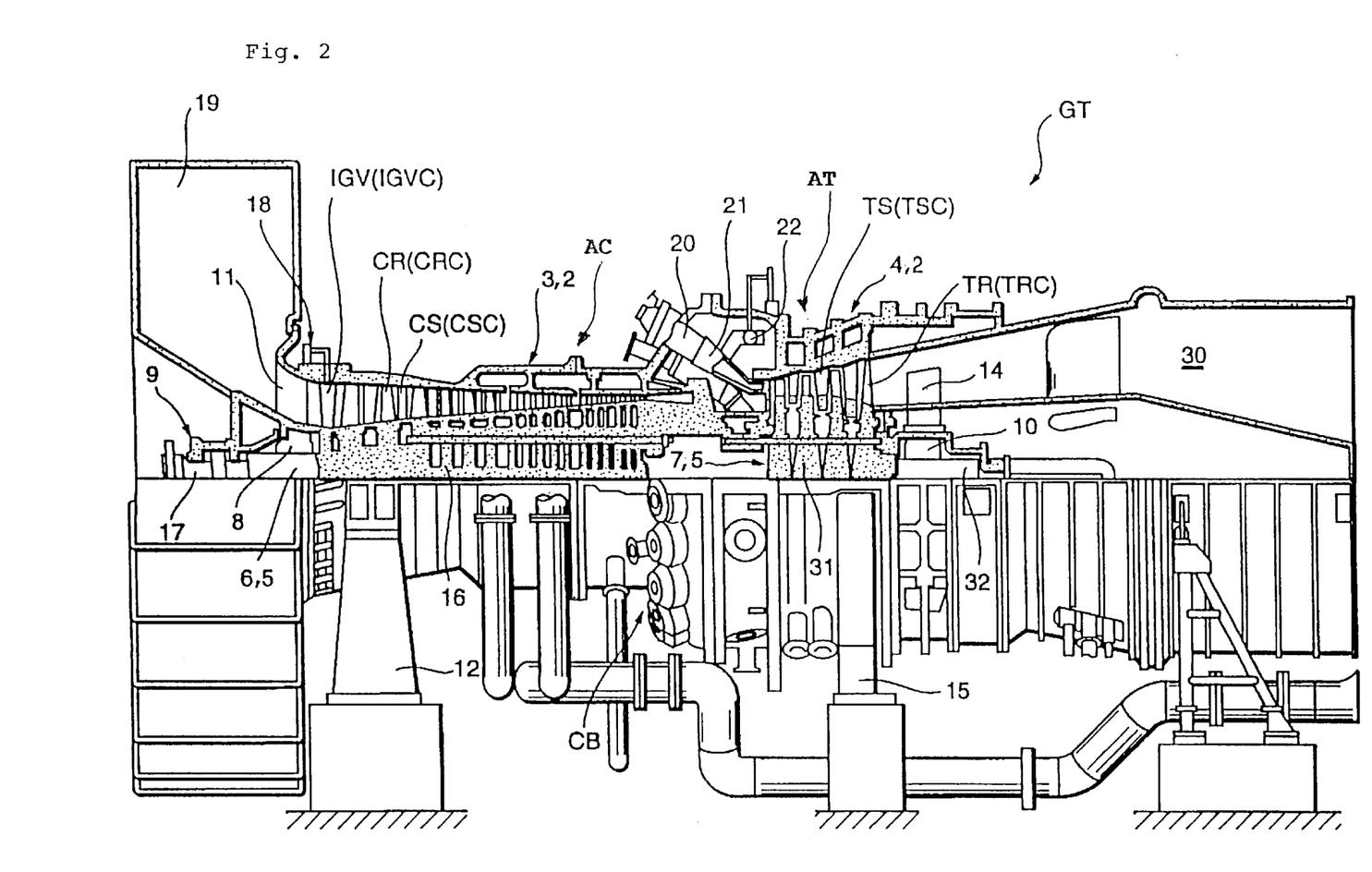
FIG. 2 is a partial cross sectional side view showing a gas turbine of the present invention constituting the combined cycle plant of FIG. 1.

FIG. 2 is a partial cross sectional side view showing the gas turbine GT constituting the combined cycle plant described above. As shown in FIG. 2, the gas turbine GT is basically composed of the compressor AC of an axial type, the combustor CB and the turbine AT of an axial type, and a gas turbine casing 2 comprises a compressor casing 3 and a turbine casing 4. Within the gas turbine casing 2, there is contained a rotor 5, which is made integrally by bolt connection of a compressor rotor 6 and a turbine rotor 7. The rotor 5 is supported by a journal bearing 8 and a thrust bearing 9 both provided on the compressor AC side and a journal bearing 10 provided on the turbine AT side and is connected on the compressor AC side to the electric generator EG1 (see FIG. 1).

In this gas turbine GT, each of the bearings 8, 9 on the compressor AC side is supported to the compressor casing 3 via a plurality of radial struts 11 and the compressor casing 3 is supported to the installation place via a rigid support 12. Also, the bearing 10 on the turbine AT side is supported to the turbine casing 4 via a plurality of tangential struts 14 and the turbine casing 4 is supported to the installation place via a trunnion support 15. By this arrangement, the thermal expansion or contraction of the gas turbine casing 2, the rotor 5, etc. is absorbed on the turbine AT side and the thermal influences given on the connection portion between the rotor 5 and the electric generator EG1 can be mitigated.

As shown in FIG. 2, the compressor rotor 6 comprises a plurality of stages (17 stages in this case) of a compressor rotor blade cascade CRC. More concretely, the compressor rotor 6 comprises a plurality of compressor discs 16, each of which is implanted with a multiplicity of compressor rotor blades CR which constitute a cascade of blades. Each of the compressor discs 16 is bolted to a main shaft 17 of the compressor AC. Within the compressor casing 3, a plurality of stages (17 stages in this case) of a compressor stator blade cascade CSC are arranged so as to correspond to each of the compressor rotor blade cascades CRC of the compressor rotor 6. Each of the compressor stator blade cascades CSC is constructed by fixing a multiplicity of compressor stator blades CS, arranged coaxially, to the compressor casing 3.

In front of the compressor stator blade cascade CSC located in the first stage, there is provided an inlet guide vane cascade IGVC. In this compressor AC, an angle adjusting mechanism 18 of inlet guide vanes IGV is operated and a setting angle of each of the inlet guide vanes IGV can be selected freely. By this arrangement, a starting time characteristic of the gas turbine GT is optimized and a partial load characteristic of the combined cycle plant CC can be enhanced.

In the compressor AC constructed as above, air is sucked from a suction port 19 and is compressed at each of the rotor blade cascades CRC of the rotationally driven compressor rotor 6 together with each of the stator blade cascades CSC fixed to the compressor casing 3 to be then supplied into the combustor CB. The combustor CB is a cannular type combustor having a plurality of combustor inner tubes 20 (16 to 20 combustor inner tubes, for example) and fuel, such as natural gas, mixed into the compressed air is burned therein. A portion of the compressed air supplied from the compressor AC is caused to bypass the combustor CB by a bypass valve 22 fitted to each of combustor transition pieces 21, so that air-fuel ratio in the combustion zone in each of the combustor inner tubes 20 is controlled so as to generate the working fluid of an optimal state and this working fluid is led to the turbine AT side.

The turbine AT comprises an annular flow passage 30 connected to the combustor transition pieces 21 and also comprises a plurality of stages (4 stages in this case) of a turbine stator blade cascade TSC arranged within the turbine casing 4 as well as a plurality of stages (4 stages in this case) of a turbine rotor blade cascade TRC fitted to the turbine rotor 7. The working fluid, while passing through the annular flow passage 30, is expanded by the turbine stator blade cascades TSC and the turbine rotor blade cascades TRC. Thereby, the energy of the working fluid is changed to a rotational torque for driving the electric generator EG1. Exhaust gas obtained at an outlet of the annular flow passage 30 is led into the heat recovery steam generator HRSG, as shown in FIG. 1.

The turbine rotor 7 comprises a plurality of turbine discs 31, each of which is implanted with a multiplicity of turbine rotor blades TR which constitute a turbine rotor blade cascade TRC and each of the turbine discs 31 is fixed to a turbine shaft 32. Also, each of a plurality of turbine stator blade cascades TSC is constructed by fixing a multiplicity of turbine stator blades TS, arranged coaxially, to the turbine casing 4.

Figure 3:
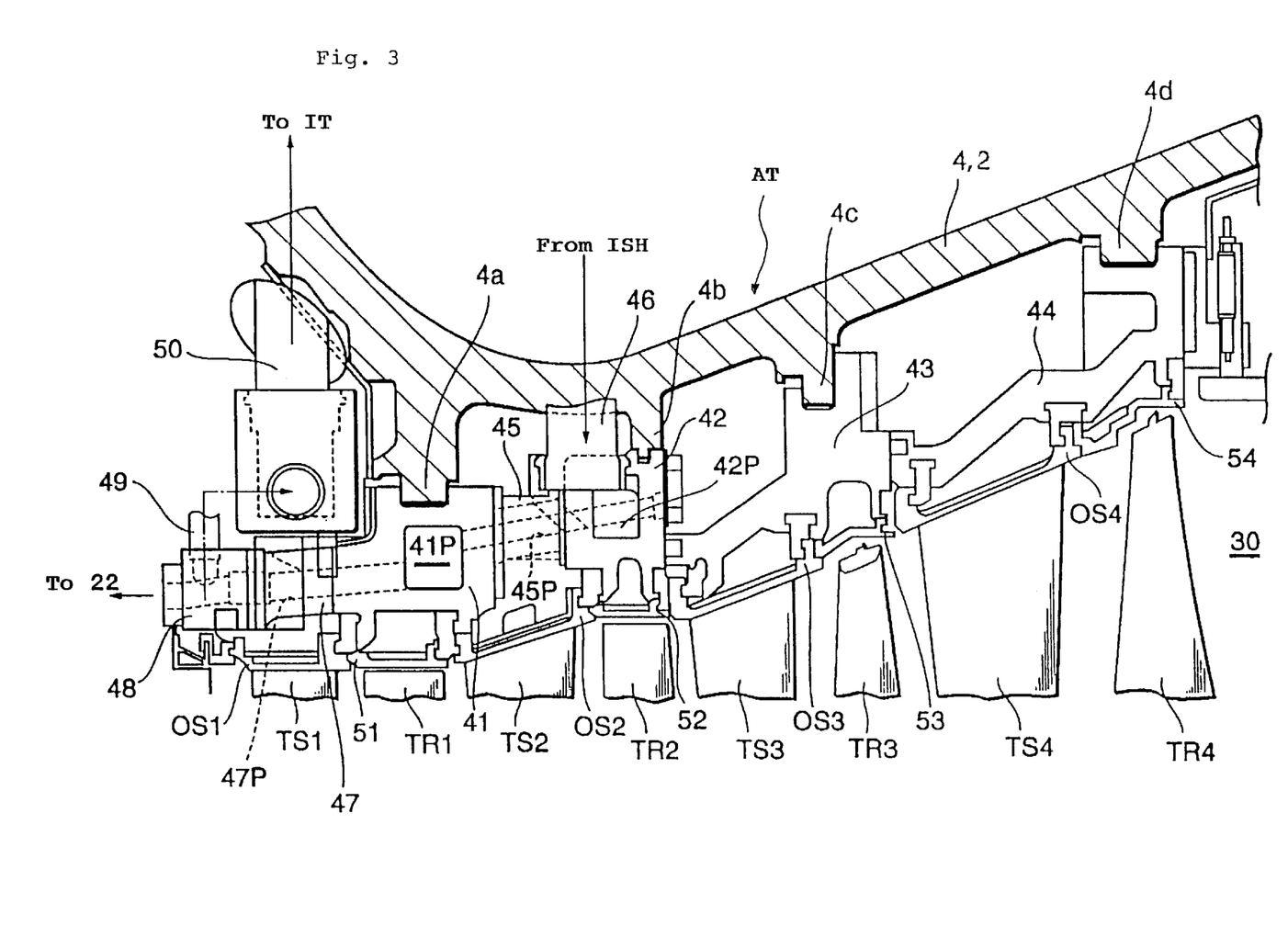
FIG. 3 is a partial cross sectional view showing a related portion of the gas turbine of FIG. 2.

FIG. 3 is a partial cross sectional view showing a related portion of the turbine AT. As shown in FIG. 3, the turbine AT is constructed as a double casing type turbine such that, within the turbine casing 4 as an outer casing, there are arranged a first blade ring 41, a second blade ring 42, a third blade ring 43 and a fourth blade ring 44, which constitute an inner casing. The first blade ring 41 corresponds to the first stage turbine stator blade cascade TSC and rotor blade cascade TRC and surrounds an outer circumferential periphery of each of the first stage turbine stator blades TS1 and rotor blades TR1. Likewise, the second blade ring 42 corresponds to the second stage turbine stator blade cascade TSC and rotor blade cascade TRC, the third blade ring 43 to the third stage turbine stator blade cascade TSC and rotor blade cascade TRC and the fourth blade ring 44 to the fourth stage turbine stator blade cascade TSC and rotor blade cascade TRC.

Each of the blade rings 41 to 44 is formed as an annular member of a type split horizontally into two and is fitted in the turbine casing 4. That is, as shown in FIG. 3, protrusions 4a, 4b, 4c, 4d, corresponding to the respective stages, are provided protruding in a radial direction of the turbine shaft 32 from an inner circumferential wall surface of the turbine casing 4. On the other hand, recesses, which engage slidably with the respective protrusions 4a to 4d of the turbine casing 4, are provided being recessed in an outer circumferential surface portion of each of the blade rings 41 to 44. Thus, each of the blade rings 41 to 44 is fitted to the turbine casing 4 so that a predetermined gap may be formed between a bottom surface of each of the recesses and an end face of each of the protrusions 4a to 4d. By this arrangement, each of the blade rings 41 to 44 becomes thermally expandable and contractible in the radial direction of the turbine shaft 32, even if the temperature therearound changes accompanying with temperature changes of the working fluid in operation of the gas turbine GT.

Figure 4:
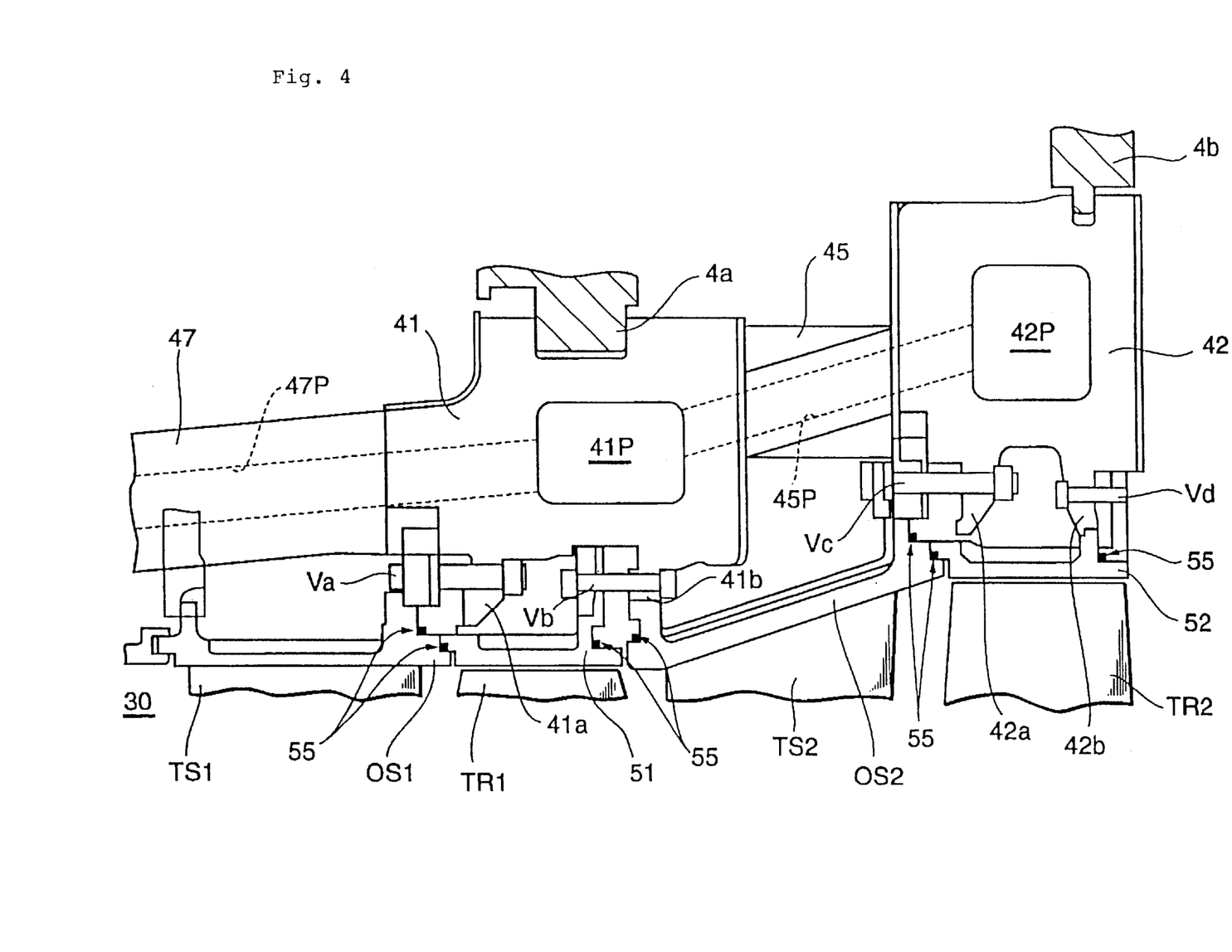
FIG. 4 is an enlarged cross sectional view showing a structure around a first blade ring and a second blade ring of the gas turbine of FIG. 2.

Also, as shown in FIG. 3 and FIG. 4 which is an enlarged cross sectional view showing a structure around the first and second blade rings, the first blade ring 41 located around each of the first stage turbine stator blades TS1 and rotor blades TR1 and the second blade ring 42 located around each of the second stage turbine stator blades TS2 and rotor blades TR2 are connected to each other via a communication member 45. The communication member 45 is provided in plural pieces (about 40 pieces, for example) arranged in the circumferential direction of each of the blade rings 41, 42. Within the first blade ring 41, a first heating medium flow passage 41P, which is able to circulate therethrough a heating medium, is provided so as to surround the outer circumferential periphery of each of the turbine rotor blades TR1. Also, within the second blade ring 42, a second heating medium flow passage 42P, which is able to circulate therethrough the heating medium, is provided so as to surround the outer circumferential periphery of each of the turbine rotor blades TR2. The first heating medium flow passage 41P and the second heating medium flow passage 42P communicate with each other via a communication flow passage 45P formed in the communication member 45.

Further, as shown in FIGS. 1 and 3, the second heating medium flow passage 42P of the second blade ring 42 located downstream of the first blade ring 41 in the working fluid flow direction is connected to a steam outlet of the intermediate pressure superheater ISH of the heat recovery steam generator HRSG via a steam supply pipe 46. On the other hand, the first heating medium flow passage 41P of the first blade ring 41 located upstream of the second blade ring 42 in the working fluid flow direction communicates with a transition piece cooling inlet 48, connected to an interior of the combustor transition piece 21, via a flow passage 47P formed in a connection member 47. A transition piece cooling outlet 49 provided near the transition piece cooling inlet 48 is connected to an outlet pipe manifold 50, which is connected to a working fluid inlet of the intermediate pressure turbine IT.

The respective blade rings 41 to 44 are provided, as shown in FIG. 3, with respective outer shrouds OS1 to OS4 of the turbine stator blades TS1 to TS4 and respective first to fourth ring segments 51 to 54 of the turbine rotor blades TR1 to TR4, so that the outer shrouds OS1 to OS4 and the ring segments 51 to 54 are members to define the annular flow passage 30. More concretely, each of the outer shrouds OS1 to OS4 has its end portion on the downstream side in the working fluid flow direction fixed to the corresponding one of the blade rings 41 to 44. Likewise, each of the ring segments 51 to 54 has its end portion on the downstream side in the working fluid flow direction fixed to the corresponding one of the blade rings 41 to 44.

If description is made on the example of the first and second blade rings 41, 42 as shown in FIG. 4, the outer shroud OS1 of each of the turbine stator blades TS1 which constitute the first stage turbine stator blade cascade TSC is fixed to an upstream side fitting portion 41a extended from a lower portion of the first blade ring 41 by a bolt Va via a spacer. Also, the first ring segment 51 is fixed to a downstream side fitting portion 41b extended from the lower portion of the first blade ring 41 by a bolt Vb via a spacer. The downstream side end portion of the outer shroud OS1 and the upstream side end portion of the first ring segment 51 are engaged slidably with each other and a seal member 55 is interposed between both of them.

Likewise, the outer shroud OS2 of each of the turbine stator blades TS2 which constitute the second stage turbine stator blade cascade TSC is fixed to an upstream side fitting portion 42a extended from a lower portion of the second blade ring 42 by a bolt Vc via a spacer. Also, the second ring segment 52 is fixed to a downstream side fitting portion 42b extended from the lower portion of the second blade ring 42 by a bolt Vd via a spacer. The downstream side end portion of the outer shroud OS2 and the upstream side end portion of the second ring segment 52 are engaged slidably with each other and another seal member 55 is interposed between both of them.

Figure 5:
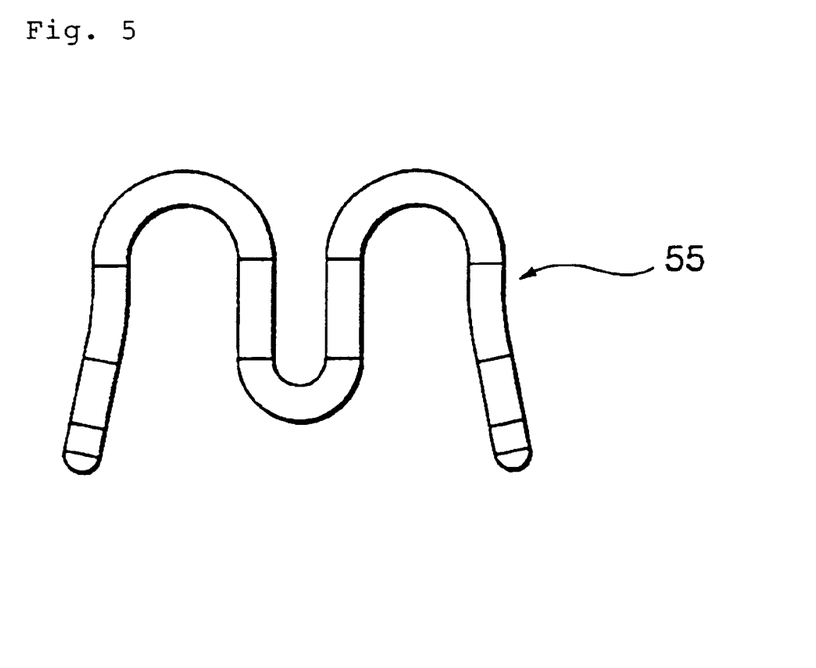
FIG. 5 is a schematic view showing a cross sectional shape of a seal member used in the gas turbine of FIG. 2.
Figure 6:
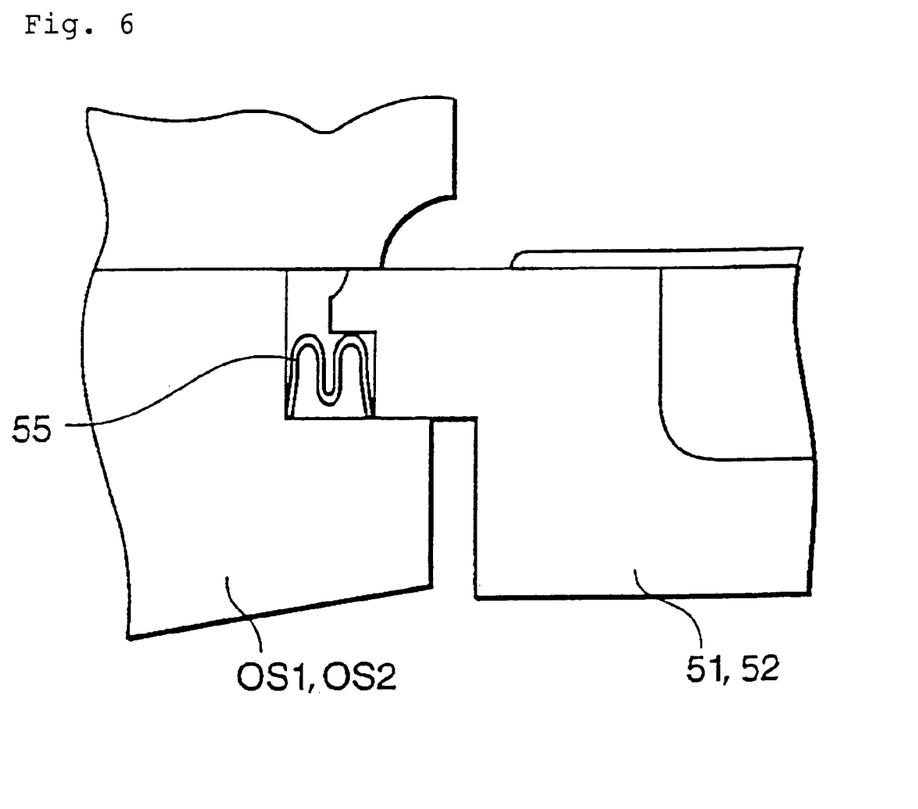
FIG. 6 is a schematic view showing a fitting state of the seal member of FIG. 5.

The seal member 55 is what is generally called an E seal and has a wave-like cross sectional shape, as shown in FIG.

5. This seal member 55 is formed by bending a metal member in a W letter shape, for example, so as to have a plurality of winding portions including portions bent in a mountain-like shape. Each of the seal members 55 is made to have such a width in the horizontal direction in FIG. 5 as to meet a planned maximum value of a gap between each of the ring segments 51, 52, etc. and each of the outer shrouds OS1, OS2, etc. of the turbine stator blades TS1 to TS4 and, in fitting such seal members 55, each of the seal members 55 is fitted into a place where the seal member 55 is to be arranged such that the mentioned winding portions are directed to the turbine casing 4 side or the mentioned mountain-like shape is directed in the radial direction of the turbine shaft. It is to be noted that the seal member 55 is also fitted between the outer shroud OS3 and the third ring segment 53 and between the outer shroud OS4 and the fourth ring segment 54 as well as between the spacer and each of the outer shrouds OS1 to OS4 and between the spacer and each of the ring segments 51 to 54.

Next, the above mentioned combined cycle plant CC and gas turbine GT will be described as to functions thereof. When operation of the combined cycle plant CC is started or stopped and the working fluid begins or stops to pass through the annular flow passage 30 of the turbine AT of the gas turbine GT, each of the turbine rotor blades TR1 to TR4 expands or contracts thermally in the radial direction of the turbine shaft 32, accompanying with temperature changes there. At the same time, each of the outer shrouds OS1 to OS4 of the turbine stator blades TS1 to TS4 and each of the ring segments 51 to 54 expand or contract thermally in an extending direction of the turbine shaft 32 (axial direction) as well. Such thermal expansion or contraction of the turbine rotor blades TR1 to TR4 may cause an increase in the blade tip loss of the rotor blade or cause a contact with the ring segments 51 to 54 to invite a breakage of the blade. Also, the thermal expansion or contraction of the outer shrouds OS1 to OS4 and the ring segments 51 to 54 may cause an increase in the loss which is brought about by enlargement of the gap between the mutually adjacent ring segment 51 and outer shroud OS1, etc. Hence, needed is an appropriate temperature control of the blade rings, accompanying with temperature changes of the rotor blades as well as of the outer shrouds of the stator blades and the ring segments.

In the present turbine AT of the gas turbine GT, steam as a heating medium is led into the second heating medium flow passage 42P formed in the second blade ring 42 from the intermediate pressure superheater ISH of the heat recovery steam generator HRSG via the steam supply pipe 46. The steam so supplied into the second blade ring 42 circulates through the second heating medium flow passage 42P and, at the same time, flows into the first heating medium flow passage 41P of the first blade ring 41 via the communication flow passage 45P of the communication member 45. The steam supplied into the first blade ring 41 circulates through the first heating medium flow passage 41P. Thus, the temperature of the blade rings 41, 42 is controlled appropriately by the steam so flowing through the flow passages 42P, 45P, 41P.

That is, even if the turbine rotor blades TR1, TR2, etc. expand or contract thermally in the radial direction of the turbine shaft 32 by the temperature changes of the working fluid in operation of the gas turbine GT, the first blade ring 41 and the second blade ring 42 are expanded or contracted correspondingly, so that the gap between the blade tip of the turbine rotor blades TR1, TR2, etc. and the ring segments 51, 52, etc. defining the annular flow passage 30 can be controlled appropriately. In addition to this, the steam supplied into the second heating medium flow passage 42P flows through the communication flow passage 45P of the communication member 45 and thereby the communication member 45 also expands or contracts corresponding to the steam temperature. Consequently, the gap between the first blade ring 41 and the second blade ring 42 which are substantially integrated together by the communication member 45 can be adjusted corresponding to the steam temperature.

Thus, in the present gas turbine GT, the second heating medium flow passage 42P is supplied with steam coming from the intermediate pressure superheater ISH or steam of which temperature is set appropriately by a temperature adjusting means (not shown) so that the communication member 45 which connects the first blade ring 41 and the second blade ring 42 to each other may be expanded or contracted and thereby the position of the first blade ring 41 and the second blade ring 42 can be adjusted so as to correspond to and follow the expanding or contracting outer shrouds OS1 to OS4 of the turbine stator blades TS1 to TS4 and the ring segments 51 to 54. As the result of this, in the present combined cycle plant CC and gas turbine GT, while the steam of the steam turbine cycle (bottoming cycle) is made use of effectively, the blade tip loss of the rotor blade of the gas turbine GT can be reduced efficiently and the loss caused by leakage of the working fluid through the gap between the outer shrouds OS1 to OS4 and the ring segments 51 to 54 which constitute the annular flow passage 30 can be reduced as well.

Also, the position of the first blade ring 41 and the second blade ring 42 can be adjusted so as to correspond to and follow the expanding or contracting outer shrouds OS1 to OS4 of the turbine stator blades TS1 to TS4 and the ring segments 51 to 54 and thereby, even if the gap between the ring segments 51, 52, etc. and the outer shrouds OS1, OS2, etc. of the turbine stator blades TS1, TS2, etc. expands or contracts thermally, the seal member 55 can be deformed elastically so that expansion or contraction of the ring segments and the outer shrouds of the turbine stator blades may be absorbed smoothly and precisely. As the result of this, the gap between the ring segments 51, 52, etc. and the outer shrouds TS1, TS2, etc. of the turbine stator blades TS1, TS2, etc. can be sealed excellently.

Steam supplied into the first blade ring 41 circulates through the first heating medium flow passage 41P and, at the same time, flows into a wall interior of the combustor transition piece 21 via the flow passage 47P of the connection member 47 and the transition piece cooling inlet 48. This steam is used for cooling the combustor transition piece 21 and is then supplied to a working fluid inlet of the intermediate pressure turbine IT via the transition piece cooling outlet 49 and the outlet pipe manifold 50. Thereby, the steam, which has flown through the second heating medium flow passage 42P of the second blade ring 42, the communication flow passage 45P of the communication member 45 and the first heating medium flow passage 41P of the first blade ring 41, sequentially, and contributed to the temperature adjustment of these portions, can be further used for cooling the combustor transition piece 21. In this case, the steam is taken out easily from the combustor transition piece 21 and the circulation system of the steam (as heating medium) can be made simplified.

It is to be noted that, while the above gas turbine GT has been described as having the heating medium flow passages provided in the first blade ring 41 corresponding to the first stage stator blade cascade TSC and rotor blade cascade TRC and in the second blade ring 42 corresponding to the second stage stator blade cascade TSC and rotor blade cascade TRC as well as having the communication member 45 for connecting both of the blade rings together, the construction is not limited thereto. That is, the heating medium flow passage and the communication member can be provided in the blade rings of rear stages (for example, the third blade ring 43, the fourth blade ring 44, etc.) as well.

What is claimed is:

1. A gas turbine for generating power by expanding a high temperature high pressure working fluid at a plurality of stages of a turbine stator blade cascade provided in a turbine casing and a plurality of stages of a turbine rotor blade cascade fitted to a turbine shaft, comprising;

a first blade ring, supported to said turbine casing so as to be expandable and contractible in a radial direction of said turbine shaft, corresponding to a first turbine stator blade cascade and a first turbine rotor blade cascade which constitute any one stage of said plurality of stages;

a second blade ring, supported to said turbine casing so as to be expandable and contractible in the radial direction of said turbine shaft, corresponding to a second turbine stator blade cascade and a second turbine rotor blade cascade which constitute another stage adjacent to said one stage;

a first heating medium flow passage, provided in said first blade ring, for circulating therethrough a predetermined heating medium;

a second heating medium flow passage, provided in said second blade ring, for circulating therethrough the predetermined heating medium; and a communication member for connecting said first blade ring and said second blade ring to each other and for communicating said first heating medium flow passage and said second heating medium flow passage with each other.

2. A gas turbine as claimed in claim 1, further comprising a first annular member surrounding said first turbine rotor blade cascade and a second annular member surrounding said second turbine rotor blade cascade; and being constructed such that a first outer shroud of each of turbine stator blades, which constitute said first turbine stator blade cascade, and said first annular member engage slidably with each other and said first outer shroud and said first annular member, respectively, are fixed at one side of their both sides in a flow direction of said working fluid to said first blade ring, and a second outer shroud of each of turbine stator blades, which constitute said second turbine stator blade cascade, and said second annular member engage slidably with each other and said second outer shroud and said second annular member, respectively, are fixed at one side of their both sides in the flow direction of said working fluid to said second blade ring.

3. A gas turbine as claimed in claim 2, wherein a seal member is interposed between said first outer shroud of each of the turbine stator blades, which constitute said first turbine stator blade cascade, and said first annular member and between said second outer shroud of each of the turbine stator blades, which constitute said second turbine stator blade cascade, and said second annular member, respectively.

4. A gas turbine as claimed in claim 3, wherein said seal member is formed in a wave-like cross sectional shape having a plurality of mountain-like winding portions and is arranged with said winding portions being directed to the radial direction of said turbine shaft.

5. A gas turbine as claimed in claim 1, wherein said second blade ring is located downstream of said first blade ring in the flow direction of said working fluid and said heating medium which has passed through said second heating medium flow passage provided in said second blade ring is led into said first heating medium flow passage provided in said first blade ring via said communication member and this heating medium which has passed through said first heating medium flow passage is led into a transition piece interior of a combustor which burns said working fluid.

6. A combined cycle plant comprising a steam turbine cycle for recovering and reusing exhaust heat of a gas turbine, wherein said gas turbine comprises;

a plurality of stages of a turbine stator blade cascade provided in a turbine casing;

a plurality of stages of a turbine rotor blade cascade fitted to a turbine shaft;

a first blade ring, supported to said turbine casing so as to be expandable and contractible in a radial direction of said turbine shaft, surrounding the turbine rotor blade cascade of any one stage of said plurality of stages;

a second blade ring, supported to said turbine casing so as to be expandable and contractible in the radial direction of said turbine shaft, surrounding the turbine rotor blade cascade of another stage adjacent to said one stage;

a first heating medium flow passage, provided in said first blade ring, for circulating therethrough steam supplied from said steam turbine cycle;

a second heating medium flow passage, provided in said second blade ring, for circulating therethrough the steam supplied from said steam turbine cycle; and a communication member for connecting said first blade ring and said second blade ring to each other and for communicating said first heating medium flow passage and said second heating medium flow passage with each other.

\* \* \* \* \*